(12) United States Patent
Mittal

(10) Patent No.: US 9,405,375 B2
(45) Date of Patent: Aug. 2, 2016

(54) TRANSLATION AND SCALE INVARIANT FEATURES FOR GESTURE RECOGNITION

(71) Applicant: QUALCOMM Incorporated, San Diego, CA (US)

(72) Inventor: Arpit Mittal, Cambridge (GB)

(73) Assignee: QUALCOMM INCORPORATED, San Diego, CA (US)

(*) Notice: Subject to any disclaimer, the term of this patent is extended or adjusted under 35 U.S.C. 154(b) by 392 days.

(21) Appl. No.: 14/026,973

(22) Filed: Sep. 13, 2013

(65) Prior Publication Data

US 2015/0077322 A1    Mar. 19, 2015

(51) Int. Cl.
  *G06F 3/01*   (2006.01)
  *G06F 3/00*   (2006.01)
  *G06K 9/00*   (2006.01)

(52) U.S. Cl.
  CPC .............. *G06F 3/017* (2013.01); *G06F 3/005* (2013.01); *G06K 9/00355* (2013.01)

(58) Field of Classification Search
  None
  See application file for complete search history.

(56) References Cited

U.S. PATENT DOCUMENTS

| | | | | |
|---|---|---|---|---|
| 5,454,043 A * | 9/1995 | Freeman | .............. | A61B 5/1121 345/419 |
| 6,128,003 A * | 10/2000 | Smith | .................. | G06K 9/4647 345/156 |
| 7,340,077 B2 * | 3/2008 | Gokturk | .................. | G06F 3/017 348/208.14 |
| 7,437,488 B2 | 10/2008 | Ito et al. | | |
| 8,269,722 B2 | 9/2012 | Wu et al. | | |
| 8,897,491 B2 * | 11/2014 | Ambrus | .................. | A63F 13/06 382/100 |
| 2008/0192005 A1 | 8/2008 | Elgoyhen | | |
| 2012/0001875 A1 | 1/2012 | Li et al. | | |
| 2013/0141326 A1 | 6/2013 | Liou et al. | | |
| 2014/0172231 A1 * | 6/2014 | Terada | .................... | G06F 3/005 701/36 |
| 2014/0368422 A1 * | 12/2014 | Gupta | .................. | G06F 3/0304 345/156 |

FOREIGN PATENT DOCUMENTS

| | | |
|---|---|---|
| CA | 2507290 A1 | 11/2006 |
| EP | 2365420 A2 | 9/2011 |

OTHER PUBLICATIONS

International Search Report and Written Opinion—PCT/US2014/055527—ISA/EPO—Dec. 5, 2014.

* cited by examiner

*Primary Examiner* — Tsung-Yin Tsai
(74) *Attorney, Agent, or Firm* — Kilpatrick Townsend & Stockton LLP

(57) ABSTRACT

Methods and apparatuses of the present disclosure are presented for recognizing a gesture of a gesture object in a plurality of recorded data objects, with the recorded data objects being recorded over time. In some embodiments, a method includes computing at least one set of gesture angles using the plurality of recorded data objects, wherein each of the gesture angles in the at least one set comprises an angle measurement between two positions of the gesture object, the two positions recorded in successive data objects in the plurality of recorded data objects, and recognizing the gesture based on the at least one set of gesture angles. In some embodiments, the method includes recognizing the gesture is based further on comparing the at least one set of gesture angles to a gesture model.

30 Claims, 11 Drawing Sheets

TRANSLATION AND SCALE INVARIANT FEATURES FOR GESTURE RECOGNITION

BACKGROUND

The present disclosures generally relate to user devices or systems, and more particularly, to gesture recognition.

Technology is rapidly advancing toward touch-less human-machine interaction. No key or button presses may be required, but rather human-machine interaction may be accomplished via gestures. A number of gesture recognition systems currently available are capable of recognizing a finite, pre-programmed number of gestures. These pre-programmed gestures may be recognizable by the machine based on recognizing a pre-programmed set of characteristics about the gesture, using a series of heuristics, for example. However, there are a number of drawbacks to these approaches, such as the need to pre-program the heuristics for each of the gestures, and an inability to generate new gestures. In some cases, the gesture recognition techniques need to be finely tuned beforehand, requiring cumbersome timing and calibration.

Thus, there is a need in the art for improved methods and systems for recognizing gestures.

SUMMARY

Methods and systems are presented for automated training of a gesture recognition system. In some embodiments, the system may be trained to detect a gesture without the need to pre-program rules or heuristics for detecting said gesture. Having learned the gesture via the training data, the system may then detect said gesture in a live setting.

In some embodiments, a method is presented for recognizing a gesture of a gesture object in a plurality of recorded data objects, the recorded data objects being recorded over time. The method may include computing at least one set of gesture angles using the plurality of recorded data objects, wherein each of the gesture angles in the at least one set comprises an angle measurement between two positions of the gesture object, the two positions recorded in successive data objects in the plurality of recorded data objects. The method may also include recognizing the gesture based on the at least one set of gesture angles. In some embodiments, recognizing the gesture is based further on comparing the at least one set of gesture angles to a gesture model.

In some embodiments, the method further includes computing a histogram representing a frequency of angles based on the at least one set of gesture angles, wherein the recognizing the gesture is based further on a comparison of the computed histogram to one or more histograms each representing a recognizable gesture.

In some embodiments, the at least one set of gesture angles is time-ordered. In some embodiments, the at least one time-ordered set of gesture angles further includes a first time-ordered set of gesture angles and a second time-ordered set of gesture angles, and the second time-ordered set of gesture angles includes a subdivision of the first time-ordered set of gesture angles. In some embodiments, recognizing the gesture is based further on: comparing the first time-ordered set of gesture angles to a gesture model; and comparing the second time-ordered set of gesture angles to a first subdivision of the gesture model. In some embodiments, the at least one time-ordered set of gesture angles further includes a third time-ordered set of gesture angles, and the third time-ordered set of gesture angles includes a subdivision of the second time-ordered set of gesture angles. In some embodiments, recognizing the gesture is based further on comparing the third time-ordered set of gesture angles to a subdivision of the first subdivision of the gesture model.

In some embodiments, the at least one time-ordered set of gesture angles further includes a third time-ordered set of gesture angles, and the third time-ordered set of gesture angles includes a subdivision of the first time-ordered set of gesture angles that does not include any of the gesture angles included in the second time-ordered set of gesture angles. In some embodiments, recognizing the gesture is based further on comparing the third time-ordered set of gesture angles to a second subdivision of the gesture model that does not include any of the first subdivision of the gesture model. In some embodiments, recognizing the gesture is based further on: concatenating the second time-ordered set of gesture angles with the third time-ordered set of gesture angles to generate a concatenated set of time-ordered gesture angles; concatenating the first subdivision of the gesture model with the second subdivision of the gesture model to generate a concatenated subdivision of the gesture model; and comparing the concatenated set of time-ordered gesture angles with the concatenated subdivision of the gesture model.

In some embodiments, the gesture model includes at least one trained time-ordered set of gesture angles that was generated prior to recognizing the gesture of the gesture object.

In some embodiments, an apparatus is presented. The apparatus may include at least one recording device configured to record a gesture object in a plurality of data objects over time. The apparatus may also include a processor configured to: compute at least one set of gesture angles using the plurality of recorded data objects, wherein each of the gesture angles in the at least one set comprises an angle measurement between two positions of the gesture object, the two positions recorded in successive data objects in the plurality of recorded data objects; and recognize a gesture based on the at least one set of gesture angles. In some embodiments, the processor is further configured to compare the at least one set of gesture angles to a gesture model.

In some embodiments, another apparatus is presented. The apparatus may include means for computing at least one set of gesture angles using the plurality of recorded data objects, wherein each of the gesture angles in the at least one set comprises an angle measurement between two positions of the gesture object, the two positions recorded in successive data objects in the plurality of recorded data objects; and means for recognizing the gesture based on the at least one set of gesture angles. In some embodiments, the means for recognizing the gesture are based further on means for comparing the at least one set of gesture angles to a gesture model.

In some embodiments, a non-transitory processor-readable medium is presented. The processor-readable medium may include processor-readable instructions configured to cause a processor to: record a gesture object in a plurality of data objects over time; compute at least one set of gesture angles using the plurality of recorded data objects, wherein each of the gesture angles in the at least one set comprises an angle measurement between two positions of the gesture object, the two positions recorded in successive data objects in the plurality of recorded data objects; and recognize a gesture based on the at least one set of gesture angles. In some embodiments, the instructions are further configured to cause the processor to compare the at least one set of gesture angles to a gesture model.

BRIEF DESCRIPTION OF THE DRAWINGS

An understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
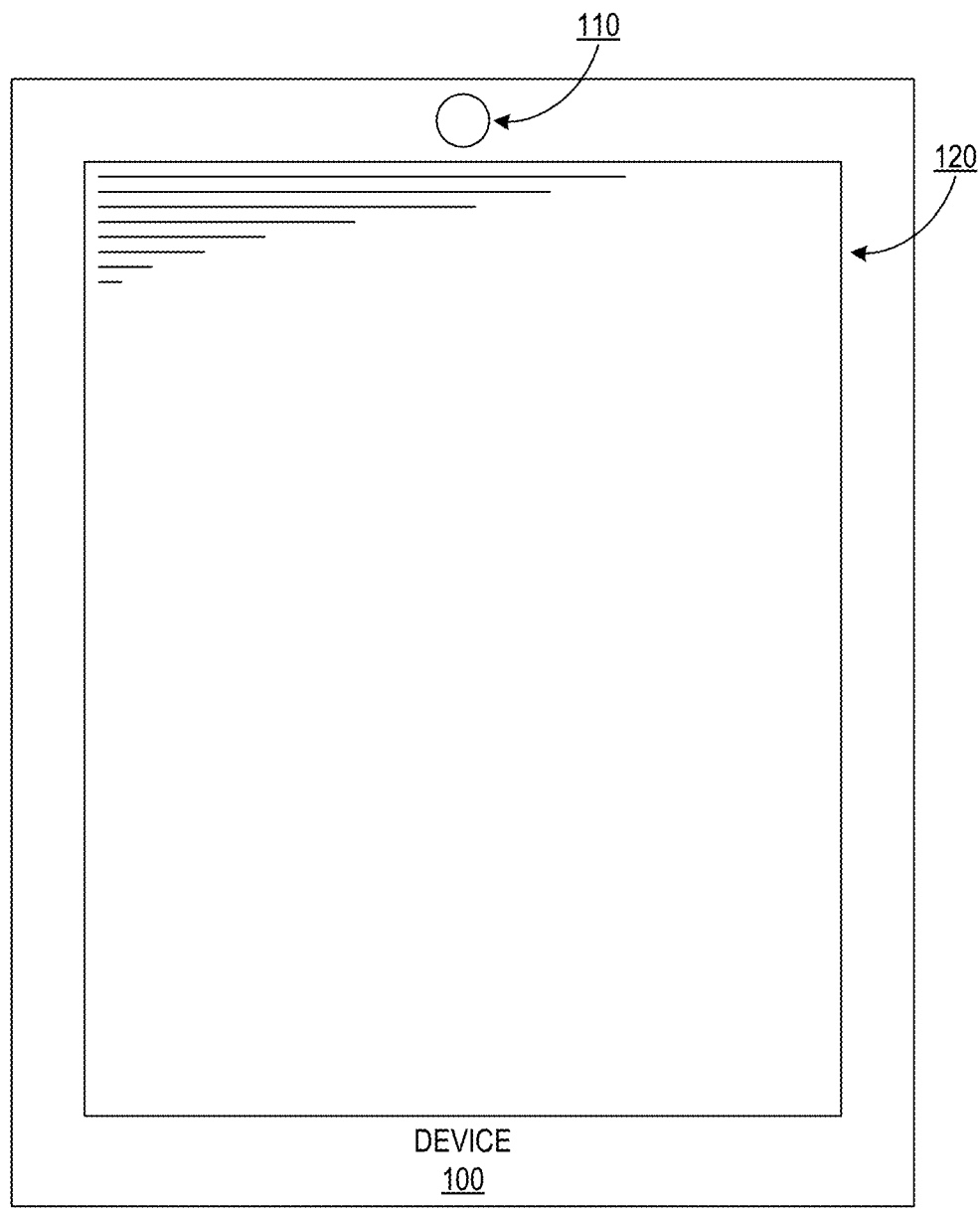
FIG. 1 is an example device that may implement various embodiments of the present disclosures.

Referring to FIG. 1, example computing device 100 may be configured to implement one or more aspects of the disclosure. For example, computing device 100 may be a smart phone, tablet computer, personal digital assistant, or other mobile device that is equipped with one or more sensors that allow computing device 100 to capture motion and/or other sensed conditions as a form of user input. In some embodiments, computing device 100 is not a mobile device, and may be, for example, a desktop computer, a gaming machine, a stationary sensor or camera, or a system of machines coupled together wirelessly or wired. Computing device 100 may be equipped with, be communicatively coupled to, and/or otherwise include one or more cameras, microphones, proximity sensors, gyroscopes, accelerometers, pressure sensors, grip sensors, touch screens, current or capacitive sensors, ultrasound sensors, motion sensors, and/or other sensors. In addition to including one or more sensors, computing device 100 also may include one or more processors, memory units, and/or other hardware components, as described in greater detail below.

In one or more arrangements, computing device 100 may use any and/or all of these sensors alone or in combination to recognize gestures performed by one or more users of the device. For example, computing device 100 may use one or more cameras to capture hand and/or arm movements performed by a user, such as a hand wave or swipe motion, among other possible movements. In addition, more complex and/or large-scale movements, such as whole body movements performed by a user (e.g., walking, dancing, etc.), may likewise be captured by the one or more cameras (and/or other sensors) and subsequently be recognized as gestures by computing device 100, for instance. In yet another example, computing device 100 may use one or more touch screens to capture touch-based user input provided by a user, such as pinches, swipes, and twirls, among other possible movements. While these sample movements, which may alone be considered gestures and/or may be combined with other movements or actions to form more complex gestures, are described here as examples, any other sort of motion, movement, action, or other sensor-captured user input may likewise be received as gesture input and/or be recognized as a gesture by a computing device implementing one or more aspects of the disclosure, such as computing device 100.

In some arrangements, for instance, a sensor such as a motion sensor, camera, or ultrasound sensor may be used to control a computer or hub based on the recognition of gestures or changes in gestures of a user. Unlike some touchscreen systems that might suffer from the deleterious, obscuring effect of fingerprints, sensor-based gesture input may allow photos, videos, or other images to be clearly displayed or otherwise output based on the user's natural body movements or poses. With this advantage in mind, gestures may be recognized that allow a user to view, pan (i.e., move), size, rotate, and perform other manipulations on image objects.

As used herein, a "gesture" is intended to refer to a form of non-verbal communication made with part of a human body, or "gesture object," and is contrasted with verbal communication such as speech. A gesture may also be recognized from a tool or instrument as part of or extended from a part of a human body, such as a flag, a rod, a wand, or the like. Accordingly, a gesture object may include a part of a human body and/or objects held by or attached to the human body. A gesture may be defined by a movement, change or transformation between a first position, pose, or expression and a second pose, position, or expression. Common gestures used in everyday discourse include for instance, an "air quote" gesture, a bowing gesture, a curtsey, a cheek-kiss, a finger or hand motion, a genuflection, a head bobble or movement, a high-five, a nod, a sad face, a raised fist, a salute, a thumbs-up motion, a pinching gesture, a hand or body twisting gesture, or a finger pointing gesture. A gesture may be detected using an image sensor, such as by analyzing an image of a user, using a tilt sensor, such as by detecting an angle that a user is holding or tilting a device, using an ultrasound sensor, or by any other approach.

A gesture object may make a gesture (or "gesticulate") by changing its position (i.e. a waving motion), or the gesture object may gesticulate without changing its position (i.e. by making a clenched fist gesture). In some arrangements, hand and arm gestures may be used to affect the control of functionality via camera input, while in other arrangements, other types of gestures may also be used. Additionally or alternatively, hands and/or other body parts (e.g., arms, head, torso, legs, feet, etc.) may be moved in making and/or detecting one or more gestures. For example, some gestures may be performed by moving one or more hands, while other gestures may be performed by moving one or more hands in combination with one or more arms, one or more legs, and so on.

Methods and apparatuses are presented for automated training of a gesture recognition system. Typical gesture recognition algorithms often times look for some characteristics in input data, such as patterns of hand motions, based on pre-programmed heuristics in order to identify gestures. For example, in order to detect a swiping hand motion moving to the right, a pre-programmed rule, or a heuristic, may be in place to look for motion of a hand in the right direction by a specific quantity, such as displacement of 20 cm over 200 milliseconds. Thus, at least one heuristic must be pre-programmed for each different gesture in order to detect the many different gestures. Conversely, if no heuristic is in place for a specific gesture, then the gesture recognition system will not be able to detect that specific gesture. Also, if any new gesture is desired to be detected, then additional programming by the user or developer is necessary to design a new heuristic linking to the new gesture.

In contrast, aspects of the present disclosures may eliminate the need of manual design or selection of data characteristics for every gesture. Instead, the gesture recognition system trains itself using training data. In some embodiments, the gesture recognition system generates its own models or signatures of gestures, such that when a user performs a gesture, the system may recognize the gesture if it matches one of the models or signatures.

Figure 2:
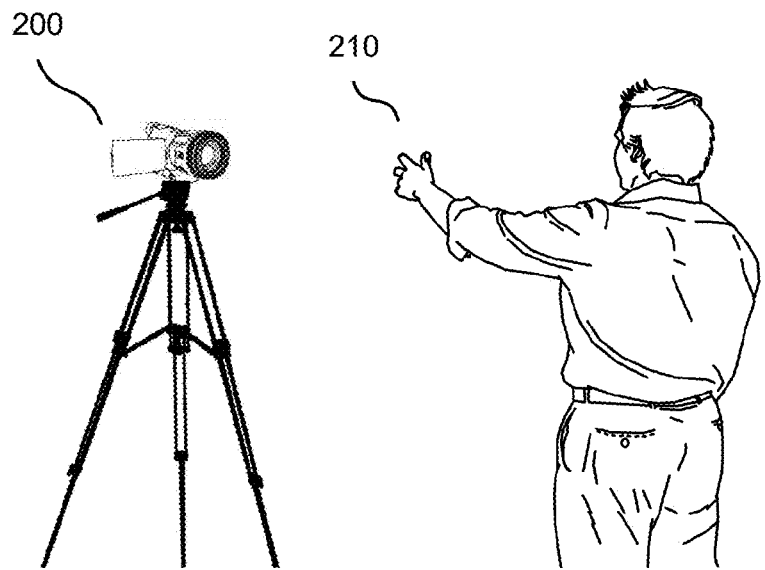
FIG. 2 illustrates a user interacting with an example device according to some embodiments.
Figure 2:
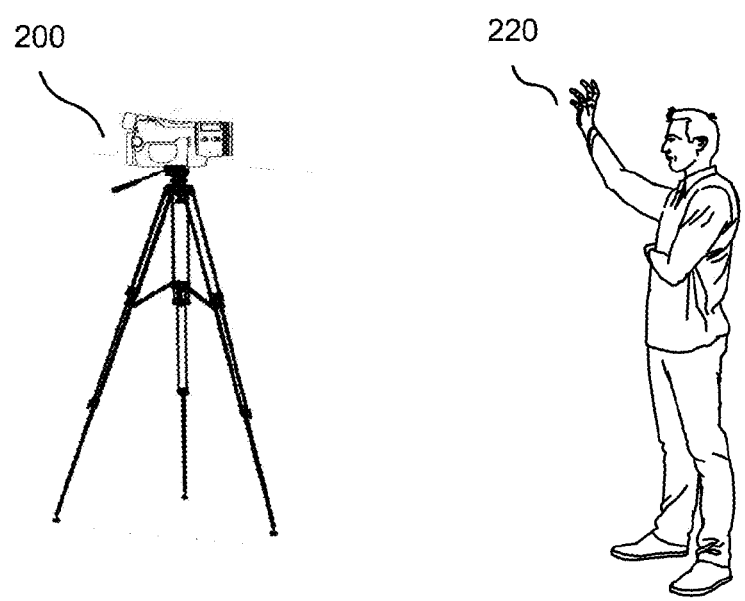

Referring to FIG. 2, example scenarios show how a user may utilize at least some aspects of the present disclosures. Here, a user may perform a gesture 210 in front of image recording device 200, which is configured to implement various embodiments. Device 200 may record the gesture 210 in a series of data objects, recorded successively over time. The data objects may be of various mediums capable of identifying the position of the gesture object in each data object as it performs the gesture over time. In some embodiments, the data objects may be digital photographs. In other embodiments, the data objects may be infrared-based images. In other embodiments, the data objects may be ultrasound objects, and the like. Accordingly, in some embodiments, device 200 may not be an image recording device, but instead may be a device configured to record data objects of a different medium, such as infrared images, ultrasound objects, and the like.

Still referring to FIG. 2, in some embodiments, prior to gesture 210 being performed, device 200 may not be configured to recognize gesture 210. However, device 200 may be configured to "learn" the gesture 210 after recording the gesture 210, analyze certain characteristics about gesture 210, and generate a signature or model representing gesture 210 based on said characteristics. In other words, device 200 can be "trained" to recognize gesture 210 based on performing the initial gesture 210 as training data. Examples of the characteristics about gesture 210 will be discussed more, below. Once device 210 has generated the signature or model of gesture 210, then device 210 can record subsequent gestures, analyze the characteristics of those gestures, and determine if those characteristics match or are substantially similar to the properties of the model or signature of gesture 210. If so, then the subsequent gesture may be recognized as gesture 210. In some embodiments, an action or command may be associated with gesture 210, such that whenever gesture 210 is recognized, device 200 may be configured to perform the action or command.

Gesture 220 may be a different gesture than gesture 210, and similarly may not be recognized at first by device 200. Device 200 can be trained to recognize gesture 220 in a similar method as those described above. Then, having generated a model or signature for both gestures 210 and 220, device 200 would be configured to record gesture object data in a live setting, analyze the characteristics of the gesture object data, and recognize the gesture object data as matching either gesture 210 or gesture 220 if the characteristics of the live gesture object data matches or is substantially similar to the model or signature of gesture 210 or gesture 220, respectively.

Figure 3A:
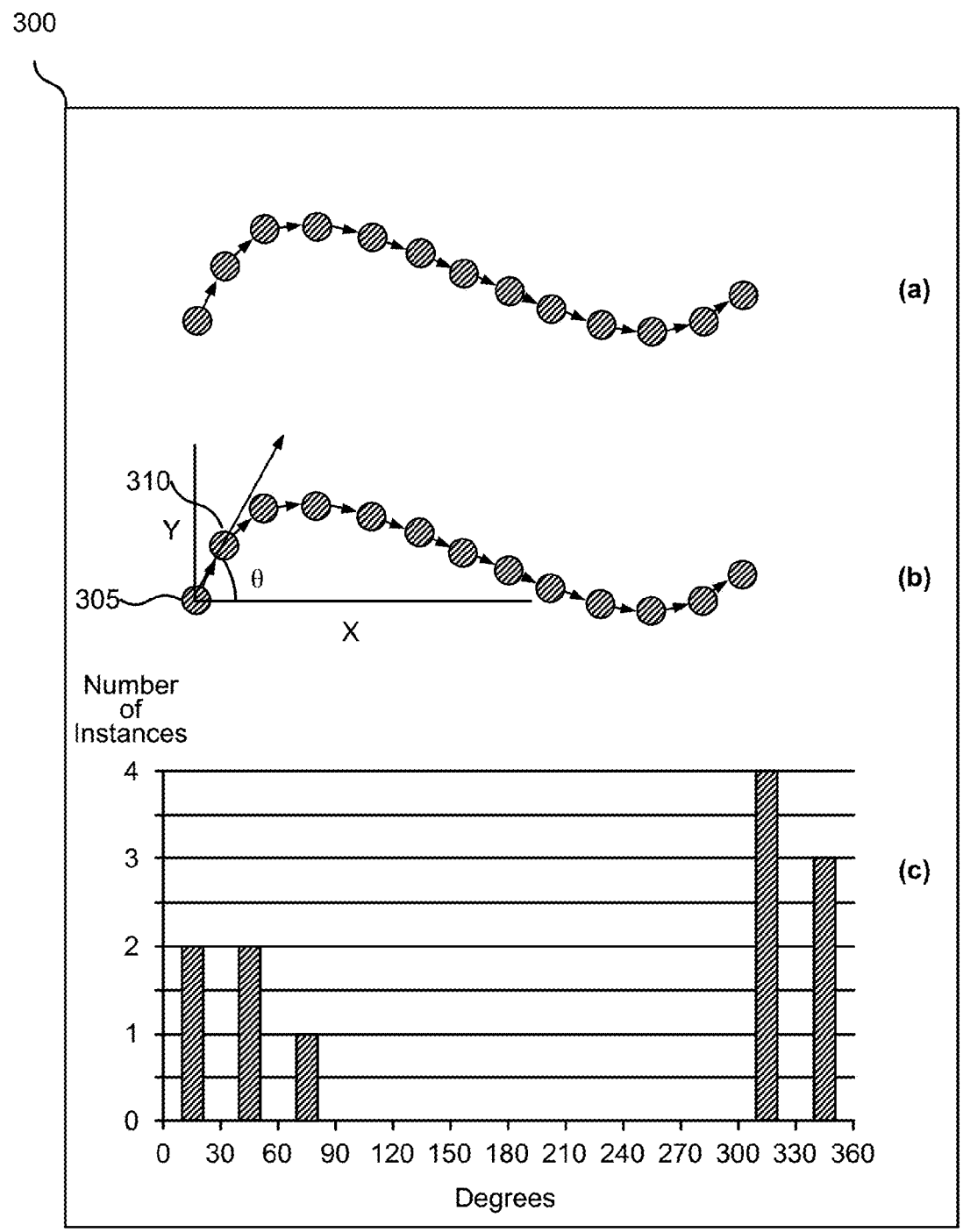
FIGS. 3A, 3B, and 3C illustrate example data analyses of gestures according to some embodiments.

Referring to FIG. 3A, the graphs contained in block 300 illustrate a set of example characteristics that may be analyzed in order to first learn the gesture initially, and then to compare a gesture being performed in a live setting to trained models or signatures of learned gestures. For instance, graph 300(a) may represent a two-dimensional path of a gesture performed by a gesture object. Each circle may represent the position of the gesture object at a particular frame in a set of recorded data objects. Examples of a gesture object may include an open hand, finger, closed fist, tip of a wand or a flag. As some of these example gesture objects may not conform with a shape of a circle, the circles in graph 300(a) may be based on the centers, midpoints, tip, or some other consistent position on the gesture object. Examples of recorded data objects may include a series of digital images, ultrasound images, infrared images, or any other type of data object capable of recording the position of the gesture object. The one-way arrows in between each of the circle may signify a temporal aspect to the data objects, in that the circle being pointed to by the arrow indicates the position the gesture object has moved to in the next successive frame in the set of data objects. Thus, graph 300(a) shows the gesture being performed may look like a sort of wave motion moving to the right. This wave gesture has been recorded in thirteen recorded data objects, since there are thirteen circles. Obviously, depending on the speed of the gesture and the frame rate of the data object recording device, higher or lower resolution of the gesture may be recorded. In other embodiments, only a subset of all recorded data objects are used to map the gesture, e.g., every other data object is used, or one in every three.

In some embodiments, 3-dimensional positions may be recorded, and embodiments are not so limited. For purposes of explanation, only 2-dimensional examples are described herein, but one with ordinary skill in the art would readily understand how to extend these disclosures to 3-dimensional space if desired.

Referring to chart 300(b), additional characteristics of the gesture are analyzed that may be used to generate the model or signature of the gesture. For example, an angle is measured between positions of the gesture recorded in two successive frames of the set of data objects, as shown in circles 305 and 310. In this case, the angle theta ($\theta$) is measured from a horizontal (x) axis centered at the first circle 305, rotating counterclockwise from said x axis until the second circle 310 is reached. $\theta$ may be measured in degrees or radians, or any other numerical system for reliably measuring angles. For example, in this case, the angle $\theta$ may be estimated to be about 60 degrees. This angle measurement may be referred to herein as a "gesture angle." Other approaches for measuring gesture angles may be used. For example, the angle between the two successive circles may be measured starting from the second circle 310 and rotating to the first circle 305. In some embodiments, the gesture angles may range from 0 to 360 degrees. In other cases, the gesture angles may range from −180 to 180 degrees.

The same method for measuring angles may be repeated for each successive pair of circles, to compute a set of gesture angles. In this way, the gesture being graphically represented in graph 300(a) can be described as the set of gesture angles of each pair of positions of the gesture recorded in successive data objects. In general, it can be seen therefore that any gesture may be described as a set of gesture angles measured according to the concepts described in the present disclosures. In other words, a model or signature that uniquely characterizes or identifies the gesture can be determined based on this set of gesture angles.

While in these examples, successive frames of recorded data objects are used to measure the angle between two positions of the gesture, some frames may be skipped while measuring the gesture angles, according to some embodiments. In general, the term "successive" as used in the present disclosures is meant to include instances where some frames in between may be skipped while measuring the gesture angles, so long as the next gesture angle is measured from two frames where the earlier frame of the next gesture angle does not occur before the later frame of the prior gesture angle.

Having characterized the gesture by its set of gesture angles according to the concepts just described, in some embodiments, the set of gesture angles may be used to generate a signature or model of the gesture, which may then be compared against gestures performed in a live setting. For example, a live or contemporaneous set of gesture angles, being computed from a gesture performed in a live setting using techniques described above, can be compared against previously recorded sets of gesture angles. If the two sets match or are substantially similar, it may be determined that the gesture performed in the live setting is the same gesture that was recorded to create the signature or model. Thus, gestures performed in a live setting can be recognized if they match or are substantially similar to a signature or model of a previously recorded or "trained" gesture.

In some embodiments, what constitutes a live gesture to match or be substantially similar to a recorded gesture model may vary. For example, the set of gesture angles of the live gesture may need to match exactly the set of gesture angles of the gesture model. In other cases, some of the angles may be slightly different, e.g., 25% of the gesture angles may differ by +/−15 degrees from the gesture angles in the gesture model. These sensitivity and rigidity settings may be highly configurable, and embodiments are not so limited.

It can be seen then that the present disclosures may be trained to recognize any and all types of gestures using the techniques described herein. Additionally, no programming is needed, as the present disclosures may simply record a series of data objects representing the time-ordered path of the gesture and performs the above analysis on its own.

Additionally, a gesture may be recognized no matter where the gesture is being performed in the recorded data objects. For example, the gesture may be recorded in the center of the data objects, toward the sides, or in a corner of the data objects. In the way, various embodiments may be described as being "translation invariant." Additionally, because angle measurements are utilized, rather than the changes in distance or displacement, a small gesture may be recognized the same as a large gesture, as long as the shape of the gesture is the same or substantially similar. In other words, the present gesture recognition techniques may be described as being "scale invariant." Furthermore, a gesture may be recognized if it is performed slowly or quickly, because the angle measurements can be normalized by skipping frames or using other various techniques. Thus, various embodiments may be described as being "time invariant."

Referring to graph 300(c) in FIG. 3A, in some embodiments, the set of gesture angles serving as the unique model or signature of a gesture may be expressed as a histogram plot showing the frequency of angles of said gesture. Graph 300(c) shows an example histogram of the gesture represented in graphs 300(a) and 300(b). The horizontal axis represents a range of degrees of the gesture angles, from 0 to 360 degrees in this case. In some embodiments, the scale can range from −180 to 180 degrees, or other variants thereof. While degrees are used here, other comparable units, such as radians, may also be used. The vertical axis expresses the number of gesture angles that fall into the range expressed in the horizontal axis. For example, histogram 300(c) represents that the gesture in graph 300(a) may have 2 gesture angles that are measured between 0 and 30 degrees, and 1 gesture angle that is measured between 60 and 90 degrees. Additionally, there may be 4 gesture angles that are measured between 300 and 330 degrees, which is noted to mean the angle is sloping downward, since, according to graph 300(b), 0 degrees represents a horizontal line. Thus, the gesture in graph 300(a) may be said to have a unique signature or model expressed as the histogram 300(c).

Similarly, gestures that are then performed in a live setting may be characterized by their set of gesture angles, and in some embodiments, expressed as a histogram similar to graph 300(c). In some embodiments, the gestures performed in a live setting may then be recognized by comparing their histograms to the histograms of the recorded gestures. If the histograms match, or are substantially similar according to some sensitivity criteria, e.g., the gesture angles may vary by +/−5 degrees each, then it may be recognized that the gesture performed in the live setting is the gesture in the recorded model.

Figure 3B:
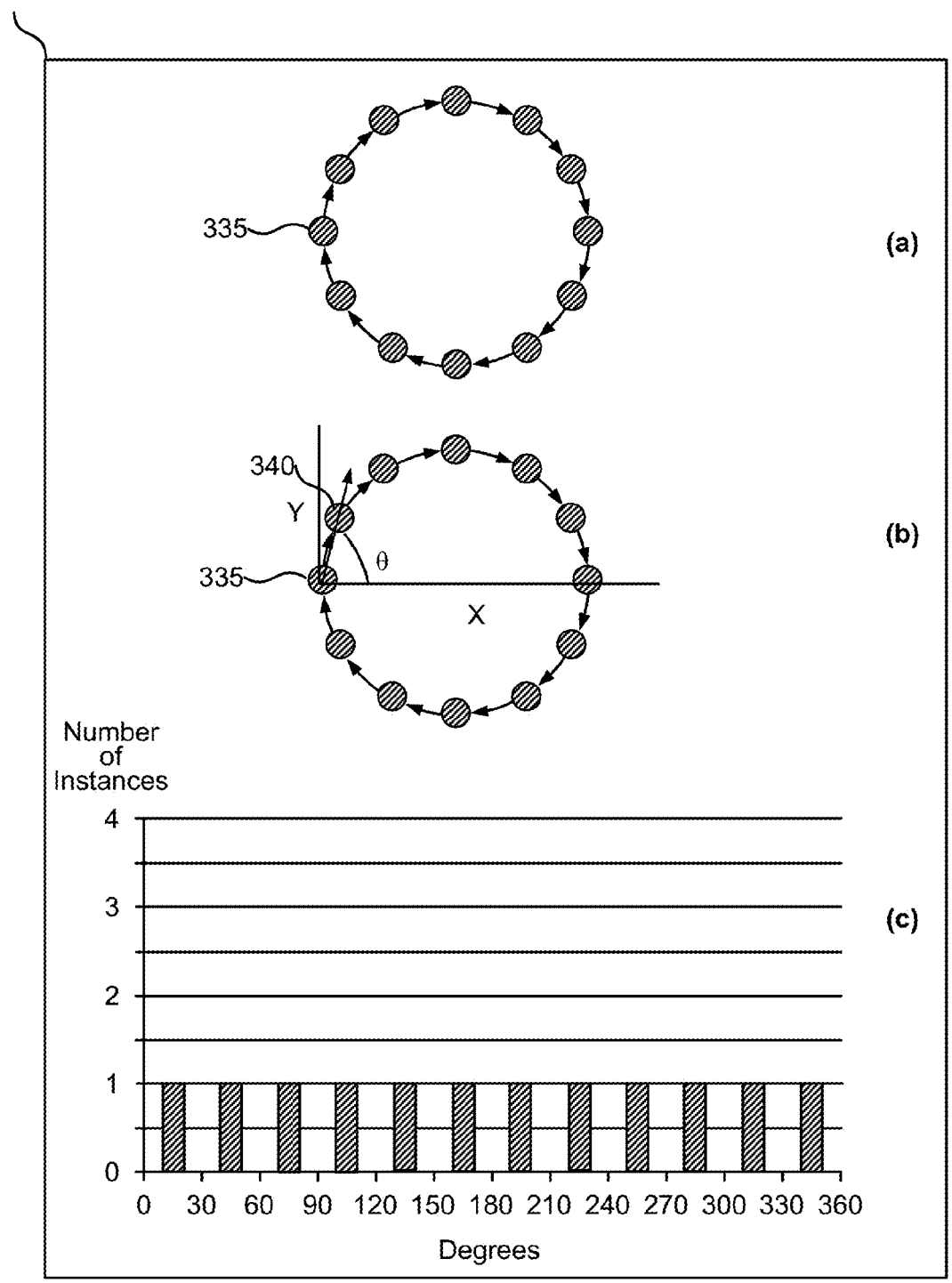

Referring to FIG. 3B, another example gesture is shown, with its corresponding gesture angle characteristics analyzed. Illustration 330 reveals a circular gesture, while graph 330(a) shows an example path a gesture object may take to perform the circular gesture. For example, the gesture object may start at the position of data object 335 and make a circular motion in the clockwise direction, ending back at the position of data object 335.

Referring to graph 330(b), a set of gesture angles may be measured, using techniques and concepts like those discussed in FIG. 3A. For example, an angle between the first data object 335 and the next recorded data object 340 may be measured starting from the horizontal axis of data object 335 and rotating counterclockwise until data object 340 is reached. In this case, the gesture angle between data objects 335 and 340 may be measured to be 70 degrees. Gesture angles between each of the other successive pairs of recorded positions may be obtained, where the set of gesture angles may represent a unique signature or model of the circular gesture.

Referring to graph 330(c), the histogram as shown may be one way to express the set of gesture angles that uniquely characterizes the circular gesture. For example, in this case, the circular gesture may be characterized as having an equal number each (i.e., 2) of all ranges (e.g., 0 to 30 degrees, 30 to 60 degrees, etc.) of gesture angles, which should be expected since the gesture is a uniform circular motion. Thus, in some embodiments, a gesture performed in a live setting could be recognized to be a circular motion if the gesture's set of gesture angles matches or is substantially similar to the histogram of the recorded circular gesture.

Figure 3C:
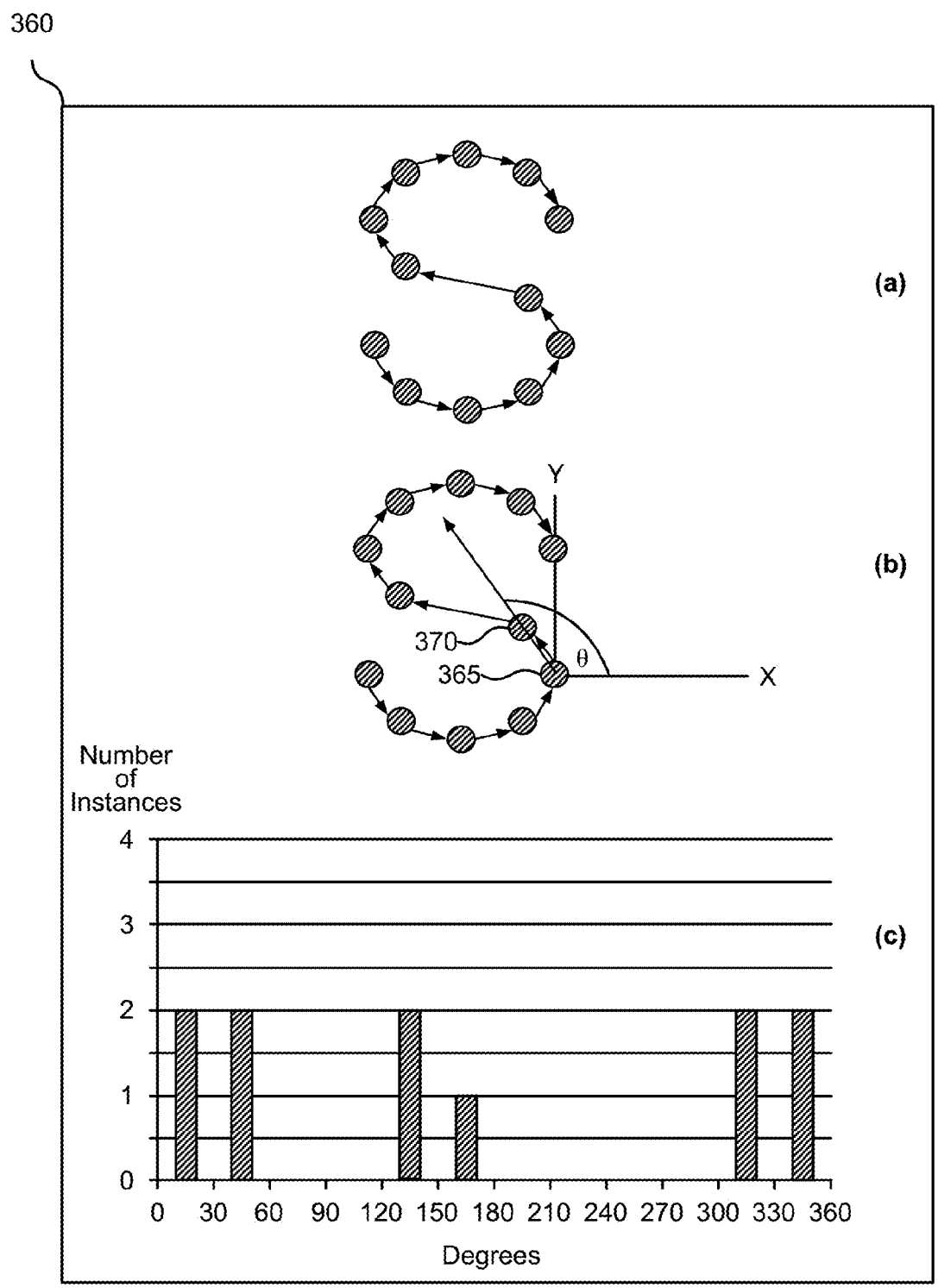

Referring to FIG. 3C, yet another example gesture is shown, with its corresponding gesture angle characteristics analyzed. Illustration 360 reveals an "S" shaped gesture, while graph 360(a) shows an example path a gesture object may take to perform the "S" shaped gesture, based on the one-way arrows.

Referring to graph 360(b), a set of gesture angles may be measured, using techniques and concepts like those discussed in FIG. 3A. For example, an angle between the position of an earlier data object 365 and the position of the next data object 370 may be measured starting from the horizontal axis of data object 365 and rotating counterclockwise until data object 370 is reached. In this case, the gesture angle between data objects 365 and 370 may be measured to be 130 degrees. Gesture angles between each of the other successive pairs of recorded data objects may be obtained, where the set of gesture angles may represent a unique signature or model of the circular gesture.

Referring to graph 360(c), the histogram as shown may be one way to express the set of gesture angles that uniquely characterizes the "S" shaped gesture. One should notice just by visual inspection the stark differences in the histograms between FIGS. 3A, 3B, and 3C. Thus, in some embodiments, a gesture performed in a live setting could be recognized to be an "S" motion if the gesture's set of gesture angles matches or is substantially similar to the histogram of the recorded "S" gesture.

Figure 4:
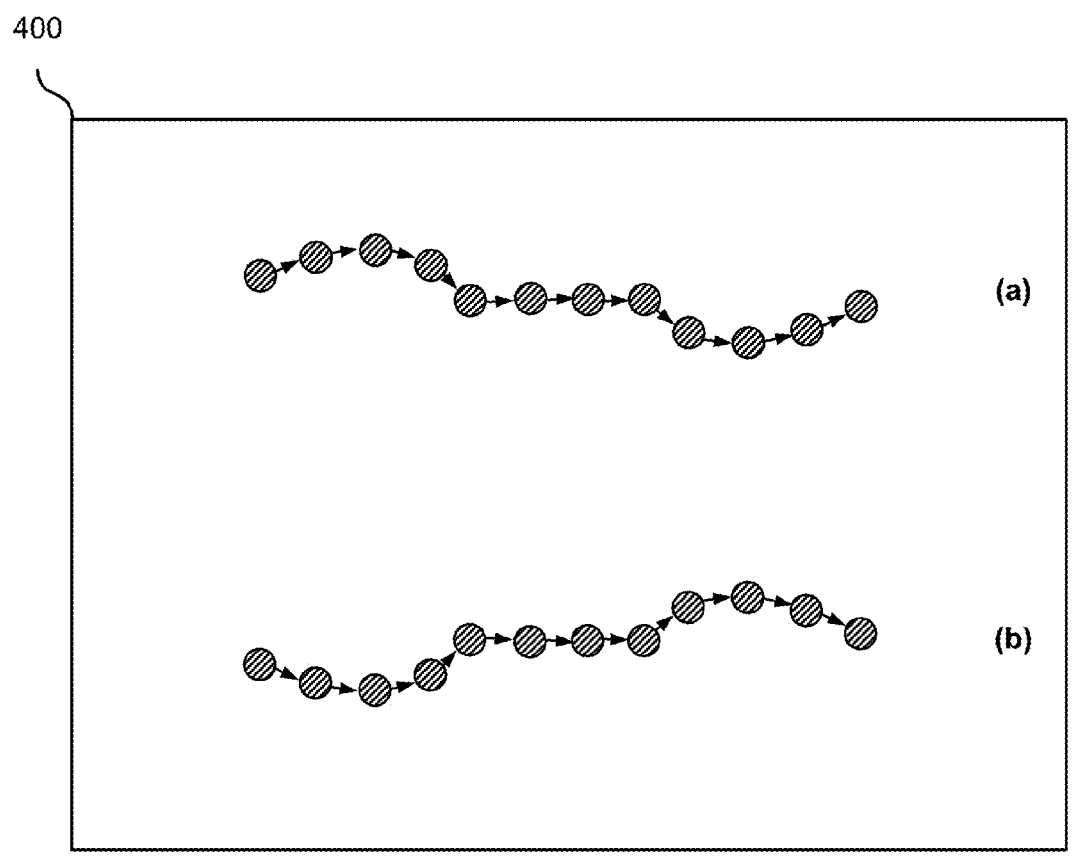
FIG. 4 illustrates an example problem in gesture recognition that can be solved according to some embodiments.

Referring to FIG. 4, in some cases, some characterizations of the gesture angles may allow for some ambiguity with gestures that are not the same but have identical gesture angles, just occurring in a different order. For example, the gesture path as shown in graph 400(a) may be seen to have identical gesture angles between successive pairs of data objects as the gesture path shown in graph 400(b), just occurring in a different order. If a histogram of the gesture angles is generated for the entire gesture, then the histogram for both graphs 400(a) and 400(b) may look identical. As another example, a gesture of a circle, such as the gesture in FIG. 3B, motioned in the counterclockwise direction could have an identical histogram of gesture angles as a gesture of a circle motioned in the clockwise direction. As yet another example, an "up-down" gesture motion may have the same histogram of gesture angles as a "down-up" gesture motion. In some cases then, additional resolution into the set of gesture angles may be needed to more effectively recognize the correct gesture.

Figure 5:
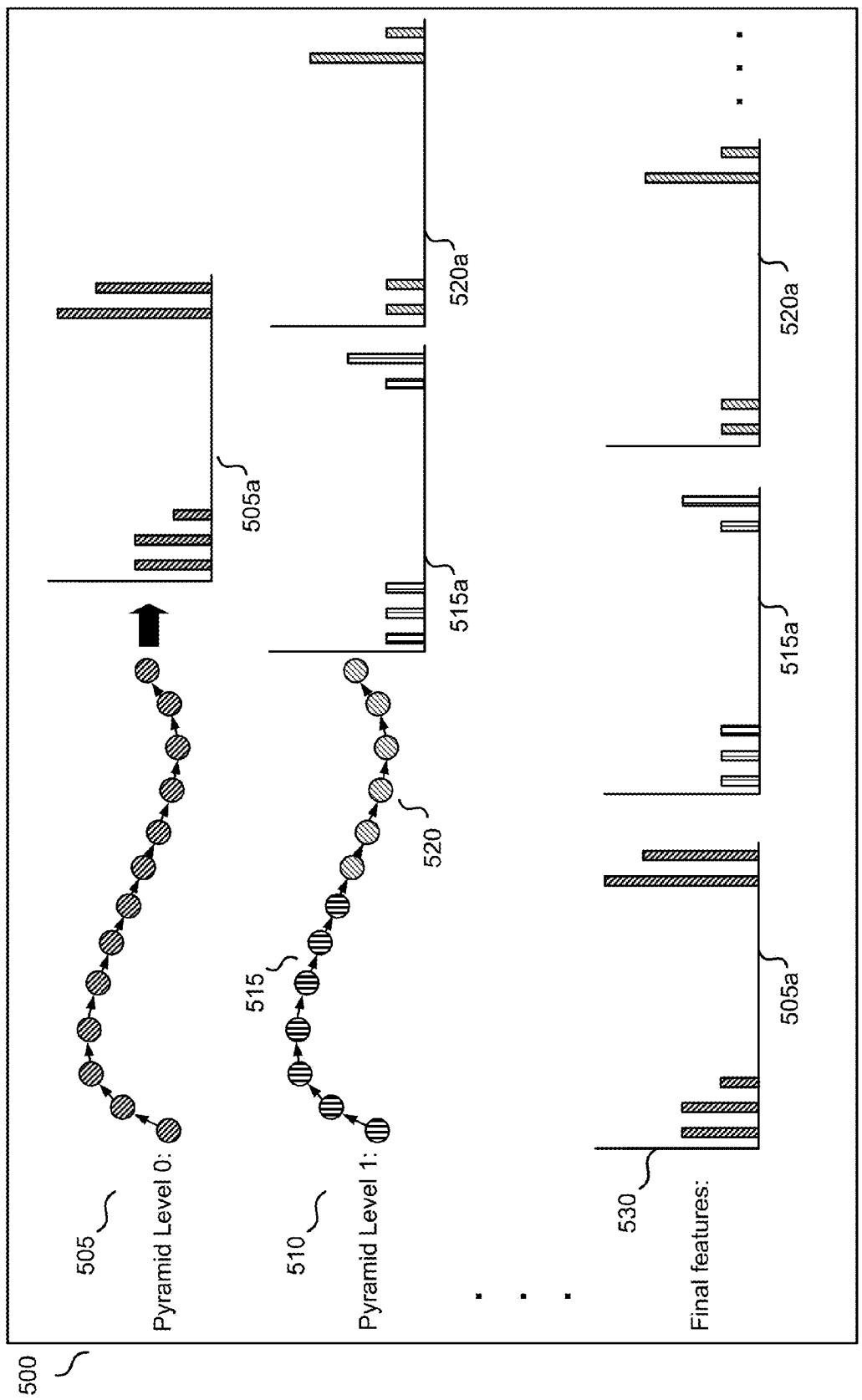
FIG. 5 illustrates additional example data analyses of gestures according to some embodiments.

Referring to FIG. 5, one solution to this issue is to further subdivide the set of gesture angles. In some embodiments, the subdivided sets of gesture angles can be appended or concatenated to the original set of gesture angles in order to form a more detailed unique signature or model of the gesture. For example, illustration 500 shows a series of histograms at various levels of detail. A first level of gesture angle detail 505, labeled as "Pyramid Level 0," shows the gesture of FIG. 3A and the corresponding histogram 505a associated with the entire set of gesture angles, to the right, consistent with the histogram of graph 300(c). A second level of detail 510 about the gesture angles may be determined, labeled as "Pyramid Level 1." Here, the wave gesture is subdivided into two halves, as shown by the horizontally-hashed data objects 515 and the "backwards-slashed" data objects 520. For each subdivided set of data objects 515 and 520, a corresponding set of gesture angles may be determined. For example, histograms 515a and 520a may represent the set of gesture angles for data objects 515 and 520, respectively. While the combination of gesture angles in histograms 515a and 520a would result in the histogram 505a of the whole gesture 505, as shown at the top, histogram 515a has a different signature than histogram 520a when measured independently of each other. It is also noted that the gesture angles in subset 515 occur in time before the gesture angles in subset 520.

A more detailed signature of the entire gesture 505 may then be expressed as a concatenation of all of the histograms, as shown in illustration 530. In this case, the histogram of Pyramid Level 0 (i.e. histogram 505a) is concatenated with the histograms of Pyramid Level 1 (i.e. histogram 515a, then with histogram 520a). The order in which the histograms are concatenated together should remain consistent when performing similar concatenations for other gestures. For example, in this case, the histogram 505a of the entire gesture occurs first, and then the histogram 515a of the first half of the gesture is appended next, and then the histogram 520a of the second half of the gesture is appended thereafter. Thus, if a different gesture than gesture 505 is recorded, with gesture angles overall being the same as gesture 505 but occurring in a different order, the more detailed concatenation of the varying Pyramid Levels would reveal a different concatenated gesture angle signature, because the subdivisions of gesture angles would be different. For example, if a gesture having the second half of gesture 505 performed in the first half, and having the first half of gesture 505 performed in the second half, then the final concatenation of gesture angles, a la illustration 530, would have histograms 520a and 515a appended in reverse order. Thus, when comparing this example gesture to the recorded concatenation 530, the two gestures would be successfully distinguished and differentiated because the concatenations of the histograms would appear in a different order.

The labels "Pyramid Level 0," "Pyramid Level 1," etc. may describe a series of hierarchical sets of gesture angles, where each level of the pyramid may provide a description of gesture angles within a smaller subset or subdivision of the higher level within the pyramid. For example, as shown, Pyramid Level 1 details a subdivision of two halves of the higher level 0, which details the entire gesture. Similarly, a pyramid level 2 may include 4 sets of gesture angles, each set representing half of one of the sets of gesture angles in level 1. These sets of gesture angles showing greater granularity may be concatenated together, similar to the process done in illustration 530. Then, gestures performed in a live setting can be analyzed in a similar way, having their concatenated sets of gesture angles, ordered in the same manner, compared against the recorded models. In this way, multiple levels of detail can be obtained in order to sufficiently distinguish between potentially ambiguous gestures. This level of detail may be a user setting or some other configurable option, and embodiments are not so limited.

In some embodiments, the characteristics of the gesture made be referred to as being "time-ordered." This term may refer generally to the idea that any gesture may be recognized based on time-ordered characteristics. Examples of time-ordered characteristics may include the gesture angles being measured from two successive data objects, and/or that the hierarchical levels of the gesture angle pyramid in some embodiments, according to the concepts described in FIG. 5, depend on the order in which the subdivisions are concatenated together.

Figure 6:
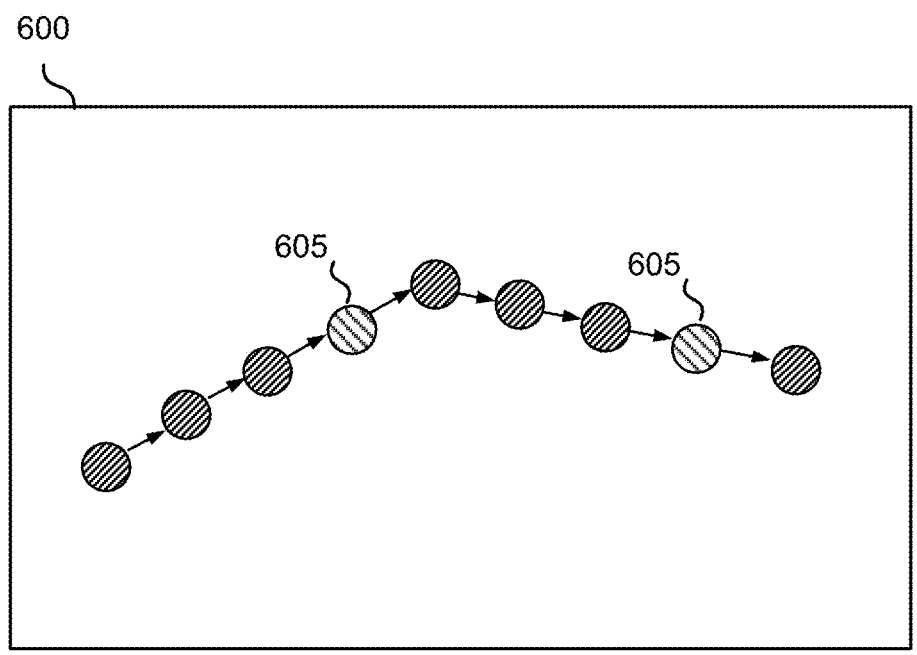
FIG. 6 illustrates another example problem in gesture recognition that can be solved according to some embodiments.

Referring to FIG. 6, graph 600 illustrates an example scenario further distinguishing aspects of the present disclosures with some conventional systems for recognizing gestures. Specifically, the example gesture in graph 600 can be successfully recognized even if some data objects, such as data objects 605, are removed or ignored. This may be because the set of gesture angles may be sufficiently similar, either as analyzed from a histogram of gesture angles or through other comparable means, with or without some missing gesture angles. In this case, the gesture angles with or without data objects 605 would remain the same, since this example gesture shows merely one rising and one falling motion at a constant angle. By comparison, convention systems for recognizing gestures that analyze the gestures based on changes in distance or displacement would not successfully recognize the gesture, since the distances would be very different given intervening data objects are missing.

Figure 7A:
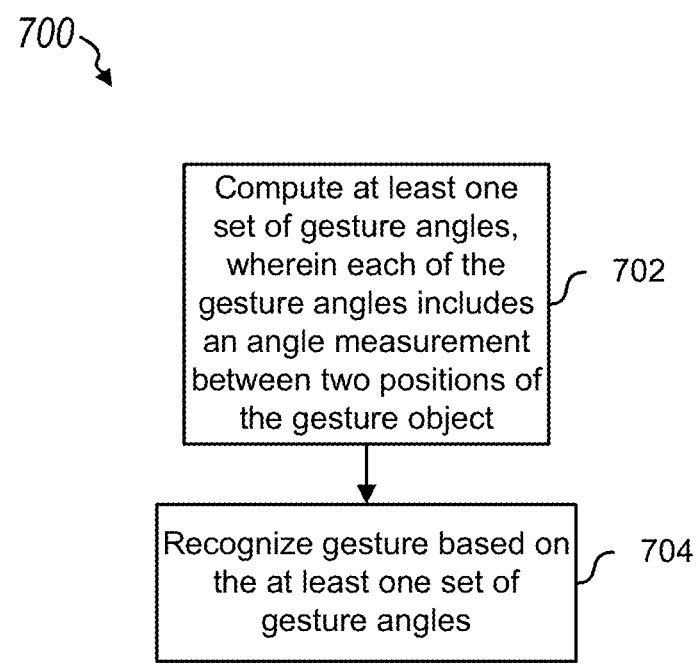
FIGS. 7A and 7B are example flowcharts illustrating methods according to some embodiments.

Referring to FIG. 7A, flowchart 700 illustrates an example series of method steps for recognizing a gesture performed by a gesture object, according to some embodiments. At block 702, the method may include computing at least one set of gesture angles, wherein each of the gesture angles includes an angle measurement between two positions of the gesture object. In some embodiments, the gesture object may be recorded in a plurality of data objects. Examples of data objects may include digital images, ultrasound objects, infrared images and the like. Example gesture objects may include a person's hand, a flag, a wand, a finger, and the like. At block 704, the gesture may be recognized based on the at least one set of gesture angles. Blocks 702 and 704 may be consistent with the disclosures provided in any of FIGS. 1, 2, 3A, 3B, and 3C.

Figure 7B:
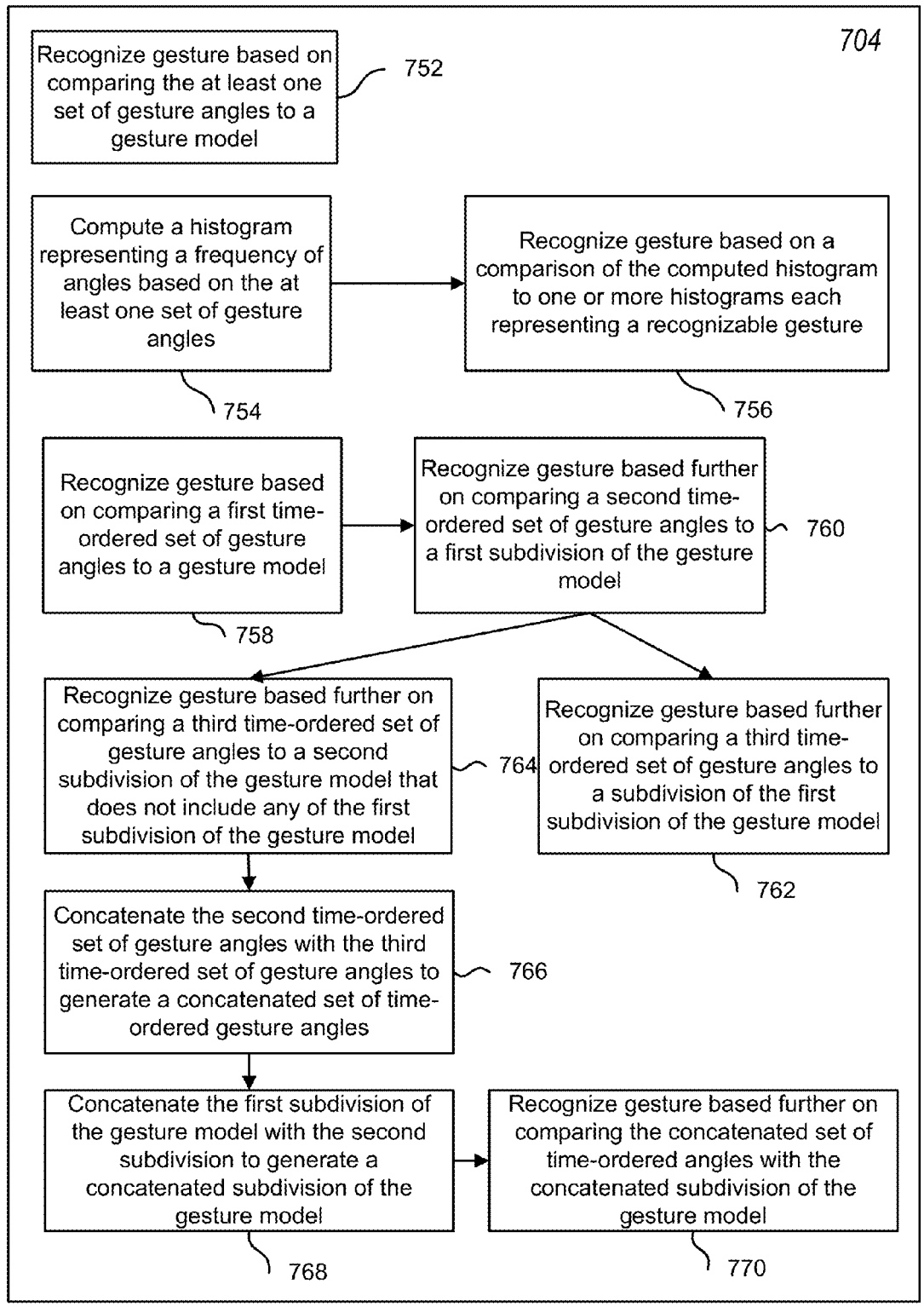

Referring to FIG. 7B, in some embodiments, block 704 includes further method steps for recognizing the gesture. For example, in some embodiments, at block 752, recognizing the gesture may be based on comparing the at least one set of gesture angles to a gesture model. In some embodiments, the gesture model may be generated based on the techniques discussed herein.

In some embodiments, at block 754, block 704 may include computing a histogram representing a frequency of angles based on the at least one set of gesture angles. At block 756, the gesture may be recognized based on a comparison of the computed histogram to one or more histograms each representing a recognizable gesture. In some embodiments, the one or more histograms may be included in one or more gesture models. In some embodiments, computing the histogram may be consistent with the descriptions for generating the histograms as described in any of FIGS. 3A, 3B, and 3C.

In some embodiments, at block 758, block 704 may include recognizing the gesture based on comparing a first time-ordered set of gesture angles to a gesture model. The time-ordered set of gesture angles may be consistent with any of the time-ordered concepts described in any of the disclosures herein. In some embodiments, at block 760, recognizing the gesture may be based further on comparing a second time-ordered set of gesture angles to a first subdivision of the gesture model. In some embodiments, at block 762, recognizing the gesture may be based further on comparing a third time-ordered set of gesture angles to a subdivision of the first subdivision of the gesture model. Examples of the second time-ordered set of gesture angles may include subdividing the entire set of gesture angles into two halves and generating a set of gesture angles based only on one of the halves. An example of a first subdivision of the gesture model may include any of the subdivisions described in FIG. 5. An example of a third time-ordered set of gesture angles may include the other half of the set of gesture angles, or a subdivision of the first half of gesture angles, described above. In general, these descriptions may be consistent with the concepts described in FIG. 5.

In other embodiments, at block 764, recognizing the gesture may be based further on comparing a third time-ordered set of gesture angles to a second subdivision of the gesture model that does not include any of the first subdivision of the gesture model. For example, the second subdivision may be a second half of the entire set of gesture angles of the gesture model, where the first subdivision of the gesture model is the first half of the entire set of gesture angles. In some embodiments, at block 766, the method may further include concatenating the second time-ordered set of gesture angles with the third time-ordered set of gesture angles to generate a concatenated set of time-ordered gesture angles. At block 768, the method may further include concatenating the first subdivision of the gesture model with the second subdivision to generate a concatenated subdivision of the gesture model. At block 770, recognizing the gesture may be based further on comparing the concatenated set of time-ordered angles with the concatenated subdivision of the gesture model. Examples of these concatenations may include the descriptions in FIG. 5.

Many embodiments may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 8:
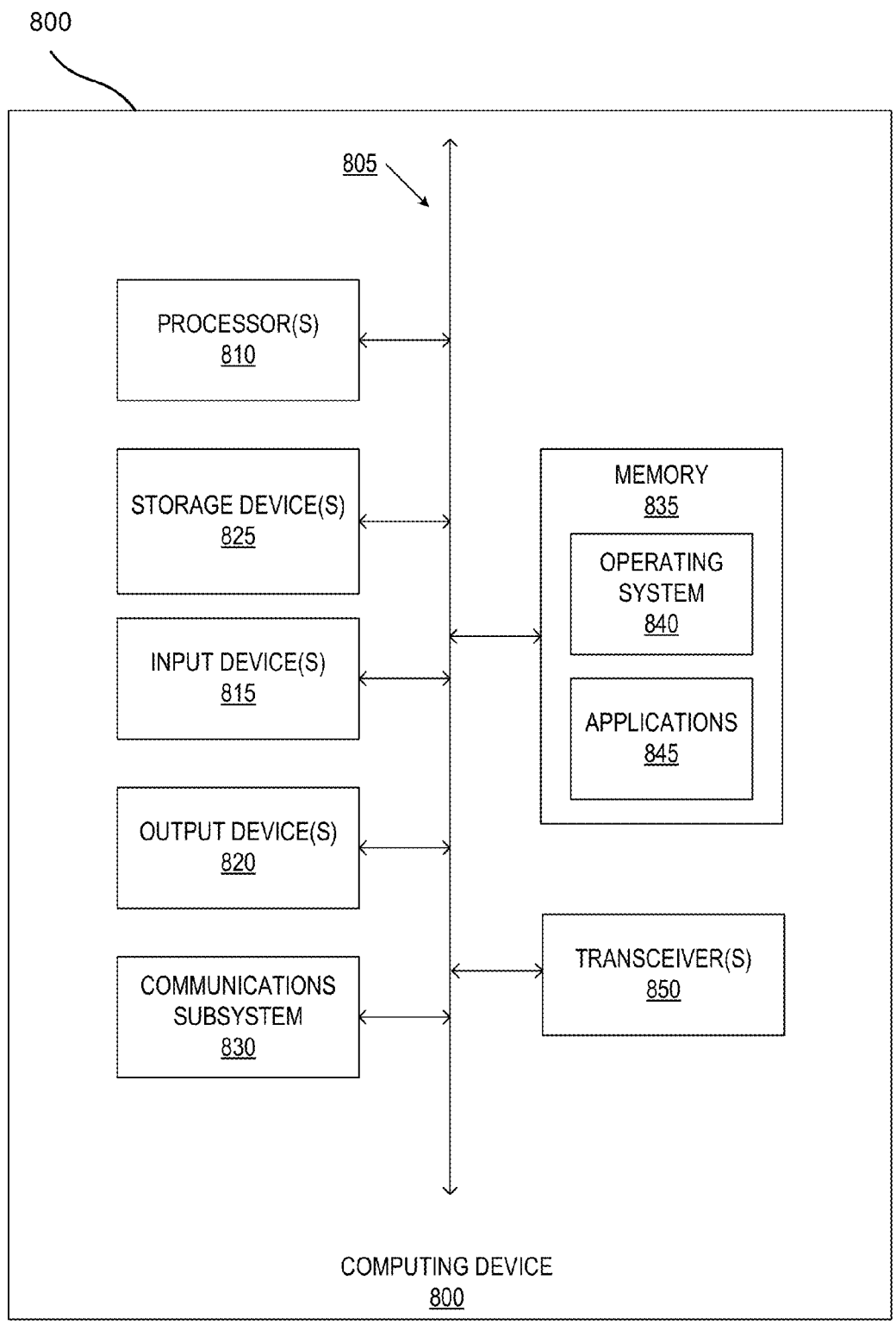
FIG. 8 is a block diagram of a computing device according to some embodiments.

Having described multiple aspects of improving assistance data parameters in floor plan maps for indoor positioning, an example of a computing system in which various aspects of the disclosure may be implemented will now be described with respect to FIG. 8. According to one or more aspects, a computer system as illustrated in FIG. 8 may be incorporated as part of a computing device, which may implement, perform, and/or execute any and/or all of the features, methods, and/or method steps described herein. For example, computer system 800 may represent some of the components of a hand-held device. A hand-held device may be any computing device with an input sensory unit, such as a wireless receiver or modem. Examples of a hand-held device include but are not limited to video game consoles, tablets, smart phones, televisions, and mobile devices or mobile stations. In some embodiments, the system 800 is configured to implement any of the methods described above. FIG. 8 provides a schematic illustration of one embodiment of a computer system 800 that can perform the methods provided by various other embodiments, as described herein, and/or can function as the host computer system, a remote kiosk/terminal, a point-of-sale device, a mobile device, a set-top box, and/or a computer system. FIG. 8 is meant only to provide a generalized illustration of various components, any and/or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a camera, wireless receivers, wireless sensors, a mouse, a keyboard and/or the like; and one or more output devices 820, which can include without limitation a display unit, a printer and/or the like. In some embodiments, the one or more processor 810 may be configured to perform a subset or all of the functions described above with respect to FIGS. 7A and 7B. The processor 810 may comprise a general processor and/or and application processor, for example. In some embodiments, the processor is integrated into an element that processes visual tracking device inputs and wireless sensor inputs.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 800 might also include a communications subsystem 830, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a non-transitory working memory 835, which can include a RAM or ROM device, as described above. In some embodiments communications subsystem 830 may interface with transceiver(s) 850 configured to transmit and receive signals from access points or mobile devices. Some embodiments may include a separate receiver or receivers, and a separate transmitter or transmitters.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 8, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 800) to perform methods in accordance with the disclosure. For example, some or all of the procedures of the described methods may be performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825.

Merely by way of example, execution of the sequences of instructions contained in the working memory 835 might cause the processor(s) 810 to perform one or more procedures of the methods described herein, for example methods described with respect to FIG. 8.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 825. Volatile media include, without limitation, dynamic memory, such as the working memory 835. Transmission media include, without limitation, coaxial cables, copper wire and fiber optics, including the wires that comprise the bus 805, as well as the various components of the communications subsystem 830 (and/or the media by which the communications subsystem 830 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810. Memory 835 may contain at least one database according to any of the databases and methods described herein. Memory 835 may thus store any of the values discussed in any of the present disclosures, including FIGS. 1, 2, 3A, 3B, 3C, 4, 5, 6, 7A, 7B, and related descriptions.

The methods described in FIGS. 7A and 7B may be implemented by various blocks in FIG. 8. For example, processor 810 may be configured to perform any of the functions of blocks in flowcharts 700 and 704. Storage device 825 may be configured to store an intermediate result, such as a globally unique attribute or locally unique attribute discussed within any of blocks mentioned herein. Storage device 825 may also contain a database consistent with any of the present disclosures. The memory 835 may similarly be configured to record signals, representation of signals, or database values necessary to perform any of the functions described in any of the blocks mentioned herein. Results that may need to be stored in a temporary or volatile memory, such as RAM, may also be included in memory 835, and may include any intermediate result similar to what may be stored in storage device 825. Input device 815 may be configured to receive wireless signals from satellites and/or base stations according to the present disclosures described herein. Output device 820 may be configured to display images, print text, transmit signals and/or output other data according to any of the present disclosures.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method for recognizing a gesture of a gesture object in a plurality of recorded data objects, the recorded data objects being recorded over time, the method comprising:
   determining at least one set of gesture angles using the plurality of recorded data objects, wherein each of the gesture angles in the at least one set of gesture angles comprises an angle measurement between two positions of the gesture object, the two positions recorded in successive data objects of the plurality of recorded data objects, wherein the at least one set of gesture angles further comprises a first subset of gesture angles and a second subset of gesture angles;
   determining a first histogram representing a frequency of angles based on the first subset of gesture angles and a second histogram representing a frequency of angles based on the second subset of gesture angles;
   recognizing the gesture based on a comparison of the first histogram and the second histogram to a respective first model histogram and second model histogram, each model histogram representing a frequency of angles of a subdivision of gestures of a gesture model; and
   modifying a behavior of the device in response to the recognizing the gesture.

2. The method of claim 1, wherein the first subset of gesture angles and the second subset of gesture angles are time-ordered; and
   the recognizing the gesture includes comparing the first subset of gesture angles and the second subset of gesture angles to a respective subdivision of the gesture model.

3. The method of claim 1, wherein the first subset of gesture angles shares gesture angles with the second subset of gesture angles.

4. The method of claim 1, wherein the at least one of gesture angles further comprises a third subset of gesture angles, and wherein the third subset of gesture angles comprises a subdivision of the second subset of gesture angles.

5. The method of claim 4, wherein the recognizing the gesture is based further on comparing a third histogram representing a frequency of angles based on the third subset of gesture angles to a third model histogram representing a frequency of angles of a subdivision of gesture angles represented by the second model histogram.

6. The method of claim 1, wherein the at least one subset of gesture angles further comprises a third subset of gesture angles, and wherein the third subset of gesture angles comprises a subdivision of the first subset of gesture angles that does not include any of the gesture angles comprising the second subset of gesture angles.

7. The method of claim 6, wherein the recognizing the gesture is based further on comparing a third histogram representing a frequency of angles based on the third subset of gesture angles to a third model histogram representing a frequency of angles of a subdivision of gestures of the gesture model that does not include any gestures of the second model histogram.

8. The method of claim 7, wherein the recognizing the gesture is based further on:
   concatenating the second subset of gesture angles with the third subset of gesture angles to generate a concatenated subset of gesture angles;

combining the second model histogram and the third model histogram to generate a concatenated model histogram; and comparing the concatenated subset of gesture angles with the concatenated model histogram.

9. The method of claim 1, wherein the gesture model comprises at least one trained set of gesture angles that was generated prior to recognizing the gesture of the gesture object.

10. An apparatus comprising:
at least one recording device configured to record a gesture object in a plurality of data objects over time; and
a processor configured to:
determine at least one set of gesture angles using the plurality of recorded data objects, wherein each of the gesture angles in the at least one set of gesture angles comprises an angle measurement between two positions of the gesture object, the two positions recorded in successive data objects of the plurality of recorded data objects, wherein the at least one set of gesture angles further comprises a first subset of gesture angles and a second subset of gesture angles;
determine a first histogram representing a frequency of angles based on the first subset of gesture angles and a second histogram representing a frequency of angles based on the second subset of gesture angles;
recognize a gesture based on comparing the first histogram and the second histogram to a respective first model histogram and second model histogram, each model histogram representing a frequency of angles of a subdivision of gestures of a gesture model; and
modify a behavior of the device in response to the recognizing the gesture.

11. The apparatus of claim 10, wherein the first subset of gesture angles and the second subset of gesture angles are time-ordered; and
the processor is further configured to recognize the gesture including comparing the first subset of gesture angles and the second subset of gesture angles to a respective subdivision of the gesture model.

12. The apparatus of claim 10, wherein the first subset of gesture angles shares gesture angles with the second subset of gesture angles.

13. The apparatus of claim 10, wherein the at least one set of gesture angles further comprises a third subset of gesture angles, and wherein the third subset of gesture angles comprises a subdivision of the second subset of gesture angles.

14. The apparatus of claim 13, wherein the processor is further configured to compare a third histogram representing a frequency of angles based on the third subset of gesture angles to a third model histogram representing a frequency of angles of a subdivision of gesture angles represented by the second model histogram.

15. The apparatus of claim 10, wherein the at least one subset of gesture angles further comprises a third subset of gesture angles, and wherein the third subset of gesture angles comprises a subdivision of the first subset of gesture angles that does not include any of the gesture angles comprising the second subset of gesture angles.

16. The apparatus of claim 15, wherein the processor is further configured to compare a third histogram representing a frequency of angles based on the third subset of gesture angles to a third model histogram representing a frequency of angles of a subdivision of gestures of the gesture model that does not include any gestures of the second model histogram.

17. The apparatus of claim 16, wherein the processor is further configured to:
concatenate the second subset of gesture angles with the third subset of gesture angles to generate a concatenated subset of gesture angles;
combine the second model histogram and the third model histogram to generate a concatenated model histogram; and
compare the concatenated subset of gesture angles with the concatenated model histogram.

18. The apparatus of claim 10, wherein the gesture model comprises at least one trained set of gesture angles that was generated prior to recognizing the gesture of the gesture object.

19. An apparatus for recognizing a gesture of a gesture object in a plurality of recorded data objects, the recorded data objects being recorded over time, the apparatus comprising:
means for determining at least one set of gesture angles using the plurality of recorded data objects, wherein each of the gesture angles in the at least one set of gesture angles comprises an angle measurement between two positions of the gesture object, the two positions recorded in successive data objects of the plurality of recorded data objects, wherein the at least one set of gesture angles further comprises a first subset of gesture angles and a second subset of gesture angles;
means for determining a first histogram representing a frequency of angles based on the first subset of gesture angles and a second histogram representing a frequency of angles based on the second subset of gesture angles;
means for recognizing the gesture based on comparing the first histogram and the second histogram to a respective first model histogram and second model histogram, each model histogram representing a frequency of angles of a subdivision of gestures of a gesture model; and
means for modifying a behavior of the device in response to the recognizing the gesture.

20. The apparatus of claim 19, wherein the first subset of gesture angles and the second subset of gesture angles are time-ordered; and
the means for recognizing the gesture includes comparing the first subset of gesture angles and the second subset of gesture angles to a respective subdivision of the gesture model.

21. The apparatus of claim 19, wherein the first subset of gesture angles shares gesture angles with the second subset of gesture angles.

22. The apparatus of claim 21, wherein the at least one set of gesture angles further comprises a third subset of gesture angles, and wherein the third subset of gesture angles comprises a subdivision of the second subset of gesture angles.

23. The apparatus of claim 22, wherein the means for recognizing the gesture are based further on comparing a third histogram representing a frequency of angles based on the third subset of gesture angles to a third model histogram representing a frequency of angles of a subdivision of gesture angles represented by the second model histogram.

24. The apparatus of claim 19, wherein the at least one subset of gesture angles further comprises a third subset of gesture angles, and wherein the third subset of gesture angles comprises a subdivision of the first subset of gesture angles that does not include any of the gesture angles comprising the second subset of gesture angles.

25. The apparatus of claim 24, wherein the means for recognizing the gesture is based further on means for comparing a third histogram representing a frequency of angles based on the third subset of gesture angles to a third model histogram representing a frequency of angles of a subdivision of gestures of the gesture model that does not include any gestures of the second model histogram.

26. The apparatus of claim 25, wherein the means for recognizing the gesture is based further on:
   means for concatenating the second subset of gesture angles with the third subset of gesture angles to generate a concatenated subset of gesture angles;
   means for combining the second model histogram and the third model histogram to generate a concatenated model histogram; and
   means for comparing the concatenated subset of gesture angles with the concatenated model histogram.

27. The apparatus of claim 19, wherein the gesture model comprises at least one trained set of gesture angles that was generated prior to recognizing the gesture of the gesture object.

28. A non-transitory processor-readable medium comprising processor-readable instructions configured to cause a processor to:
   record a gesture object in a plurality of data objects over time;
   determine at least one set of gesture angles using the plurality of recorded data objects, wherein each of the gesture angles in the at least one set of gesture angles comprises an angle measurement between two positions of the gesture object, the two positions recorded in successive data objects of the plurality of recorded data objects, wherein the at least one set of gesture angles further comprises a first subset of gesture angles and a second subset of gesture angles;
   determine a first histogram representing a frequency of angles based on the first subset of gesture angles and a second histogram representing a frequency of angles based on the second subset of gesture angles;
   recognize a gesture based on comparing the first histogram and the second histogram to a respective first model histogram and second model histogram, each model histogram representing a frequency of angles of a subdivision of gestures of a gesture model; and
   modify a behavior of the device in response to the recognizing the gesture.

29. The non-transitory processor-readable medium of claim 28, wherein the first subset of gesture angles and the second subset of gesture angles are time-ordered; and
   the instructions are further configured to cause the processor to recognize the gesture including individually comparing the first subset of gesture angles and the second subset of gesture angles to a respective subdivision of the gesture model.

30. The non-transitory processor-readable medium of claim 28, wherein the first subset of gesture angles shares gesture angles with the second subset of gesture angles.

* * * * *